United States Patent [19]

Sanjurjo et al.

[11] Patent Number: 4,655,827

[45] Date of Patent: Apr. 7, 1987

[54] PROCESS FOR THE REDUCTION OF FLUORIDES OF SILICON, TITANIUM, ZIRCONIUM OR URANIUM

[76] Inventors: Angel Sanjurjo, 15010 Penitencia Creek Rd., San Jose, Calif. 95132; Kenneth M. Sancier, 561 Berkeley Ave., Menlo Park, Calif. 94025

[21] Appl. No.: 758,594

[22] Filed: Jul. 24, 1985

[51] Int. Cl.$^4$ .............. C22B 34/10; C22B 60/02; C01B 3/00; C01D 3/00
[52] U.S. Cl. .................. 75/84.4; 75/84.1 R; 423/350; 423/490; 423/499
[58] Field of Search .............. 75/84, 84.1 R, 84.4, 75/66; 423/181, 185, 197, 350, 490, 499

[56] References Cited

U.S. PATENT DOCUMENTS

| | | | |
|---|---|---|---|
| 4,046,865 | 9/1977 | Schafer | 423/499 |
| 4,244,505 | 1/1981 | Stokes, Jr. et al. | 228/223 |
| 4,379,718 | 4/1983 | Grantham et al. | 75/24 |
| 4,401,467 | 8/1983 | Jordan | 75/66 |
| 4,552,588 | 11/1985 | Elliott | 75/84.4 |
| 4,584,181 | 4/1986 | Nanis et al. | 422/241 |

*Primary Examiner*—Herbert B. Guynn
*Assistant Examiner*—Eric Jorgensen
*Attorney, Agent, or Firm*—Hedman, Gibson, Costigan & Hoare

[57] ABSTRACT

A process is disclosed for producing silicon, titanium, zirconium or uranium by reduction of a fluoro compound with sodium followed by leaching with an aqueous alkaline earth metal chloride and recovery of the sodium metal through electrolytic reduction.

11 Claims, No Drawings

PROCESS FOR THE REDUCTION OF FLUORIDES OF SILICON, TITANIUM, ZIRCONIUM OR URANIUM

BACKGROUND OF THE INVENTION

The production of elemental silicon by the reduction of silicon tetrafluoride with sodium metal is known and is described in U.S. Pat. No. 4,442,082 and in Novel Duplex Vapor - Electrochemical Method for Silicon Solar Cells (31 March 1980), both of which are incorporated by reference. The reduction of the silicon tetrafluoride with sodium metal produces a reaction product that comprises silicon and sodium fluoride. This mixture is typically separated by leaching out the sodium fluoride using an acidic aqueous leaching liquid. The loss of silicon by oxidative degradation in this process has been addressed in application Ser. No. 758,595 filed as of even date herewith by Kenneth Sancier. That application is incorporated by reference and it describes the recovery of silicon with minimum losses of silicon due to oxidation by the addition of an aqueous solution of alkaline earth metal chloride which transforms the sodium fluoride into an insoluble fluoride that is readily separated from aqueous sodium chloride.

The process described in U.S. Pat. No. 4,442,082 is directed to the production of high purity silicon for use in solar cells and other applications requiring highly pure silicon. For this reason each reactant is a possible source of impurities which may contaminate the final product. It has been found that certain commercial sources of reagents may be unsuitable and it may be necessary to carry out procedures for analysis and/or purification of reactants before the reduction reaction is carried out. The present invention is directed to providing means for regeneration of sodium from the sodium chloride obtained in the fluoride precipitation of the sodium fluoride obtained from the reduction of the silicon tetrafluoride with sodium. Certain commercial sources of sodium contain traces of elements such as boron which exert a deleterious effect on solar grade silicon. In addition the reactive nature of sodium requires that it be shipped under a layer of hydrocarbon such as kerosene to prevent it from reacting with the atmosphere. The presence of the hydrocarbon is a source of carbon contamination in the final product.

It should be noted that the in situ regeneration of sodium from sodium fluoride is technically feasible but commercially unattractive because of difficulties in the operation of fluoride cells. The present invention requires that the sodium fluoride produced in the reduction of silicon tetrafluoride be transformed to sodium chloride. The reduction of the sodium chloride generated in this reaction and the recycle of this regenerated sodium in a closed system will avoid the necessity of obtaining pure grades of sodium metal or to refine certain commercial grades of the sodium metal prior to use. In addition the recycling of the sodium metal from the sodium chloride that is generated from the reaction of an alkaline earth metal chloride and sodium fluoride will improve the overall economics of the process.

Accordingly it is a primary object of this invention to provide a method for the regeneration and recycle of sodium metal in a process which utilizes sodium metal for the reduction of silicon tetrafluoride, titanium tetrafluoride, zirconium tetrafluoride, and uranium tetrafluoride or hexafluoride.

It is also an object of this invention to provide a closed loop process which eliminates the need to purify or assay sodium obtained from an exogenous source.

DETAILED DESCRIPTION OF THE INVENTION

The present invention provides an integrated process for the production of elemental silicon, titanium, zirconium or uranium. The following description exemplifies the process with regard to silicon but it is equally applicable to titanium, zirconium or uranium.

(a) contacting silicon tetrafluoride with sodium to form a mixture of silicon and sodium fluoride;

(b) contacting said mixture of silicon and sodium fluoride with an aqueous solution of an alkaline earth metal chloride to form sodium chloride and an insoluble alkaline earth metal fluoride;

(c) separating sodium chloride from the alkaline earth metal fluoride and from the silicon;

(d) electrolytically regenerating sodium metal from the sodium chloride; and (e) recycling the regenerated sodium metal to step (a).

The reaction whereby silicon tetrafluoride may be reduced to form elemental silicon using sodium metal may be carried out in a reactor such as that described in U.S. Pat. No. 4,442,082.

After the silicon is formed, the reaction mixture is contacted with an aqueous alkaline earth metal chloride. The leaching with an alkaline earth metal chloride such as calcium chloride, barium chloride or magnesium chloride results in the formation of a substantially insoluble alkaline earth metal fluoride that is easily separated from the elemental silicon. The separations may be carried out very efficiently because the insoluble alkaline earth metal fluorides do not adhere to or form cohesive masses that interfere with the separation of the silicon from said insoluble alkaline earth metal fluoride.

The aqueous alkaline earth metal chloride leaching solution should be acidified with an acid. A sufficient amount of acid should be utilized to achieve a pH of less than 7.0 in the leaching solution. A preferred pH range is from 1 to 2. Suitable acids include hydrochloric, hydroiodic and hydrobromic. The preferred acid is hydrochloric. Acids such as sulfuric and phosphoric should be avoided because the phosphate and sulfate ions may be precipitated by the alkaline earth metal ions and carried over into the separated silicon. Generally, reagent grade or better acids should be used to avoid introducing any impurities into the silicon.

A stoichiometric excess of the alkaline earth metal chloride, based on the amount of fluoride that is present, should preferably be utilized in order to provide that all of the soluble fluoride ion will be converted to insoluble fluoride ion. Generally a molar ratio of from 0.9:1 to 1.3:1 or more preferably from 1.05:1 to 1.1:1 of alkaline earth metal chloride to alkali metal fluoride may be utilized. The use of a large excess of alkaline earth metal chloride should be avoided because the level of impurities introduced is directly proportional to the amount of the alkaline earth metal chloride that is utilized.

The alkaline earth metal chloride is preferably added as a concentrated or dilute aqueous solution. Generally, from 5% by weight to a saturated solution may be utilized. The aqueous solution may be added all at once or in divided amounts. The preferred alkaline earth metal chloride is calcium chloride. Refined grades are preferred although commercial grades that are free of transition metals may be utilized.

The aqueous sodium chloride solution is separated and is preferably dried to obtain solid sodium chloride which may be electrolytically decomposed in a suitable apparatus such as a Downs cell. Alternatively, the aqueous sodium chloride may be electrolytically decomposed in a mercury cathode cell followed by stripping of the sodium from the mercury cathode. Either process will result in the production of byproduct chlorine which may be collected and sold as a byproduct.

Prior to electrolytic recovery of the sodium metal, the sodium chloride solution may be extracted with a complexing agent that is capable of complexing transition metals. Suitable complexers include ethylene diamine tetraacetic acid and its derivatives. They may be used at a concentration of from 0.5%–25% by weight and preferably from 1%–10% by weight.

DESCRIPTION OF THE PREFERRED EMBODIMENTS

EXAMPLE

To 156 g of a reaction product which consists of silicon and sodium fluoride in chunks no larger than 1" in diameter obtained by reduction of silicon from silicon tetrafluoride using sodium metal is added to 95% by weight calcium chloride solution and 4 liters of water containing concentrated hydrochloric acid (1.0 ml) which is utilized to achieve a pH of about 1. After the reaction product is added, an additional 12 ml of concentrated hydrochloric acid is required to adjust the pH to about 1.2. No foaming is observed which indicates that no oxidation is taking place. The solution is stirred and after about 2 hours the silicon is observed as a black layer. The mixture is centrifuged under conditions that separate solid silicon but maintain substantially all of the calcium fluoride as a suspended solid in the leaching liquid because of the different settling rates. The mixture is washed with water seven times and about 3.5% by weight of calcium fluoride (by arc emission spectrographic analysis) remains in the silicon fraction.

The sodium chloride solution is collected from the leaching steps and is filtered and evaporated to obtain dry crystalline sodium chloride and any excess calcium chloride. The dry crystalline sodium chloride may then be fed to a Downs cell of the type described in Kirk-Othmer Encyclopedia of Chemical Technology, Vol 18, 2nd edition pp 440–444 (1969) which is incorporated by reference. The presence of any calcium chloride that is carried over from the leaching steps will not affect the operation of the Downs cell because calcium chloride is a component that is ordinally charged to the Downs cell when sodium is produced. In the alternative all or a portion of the sodium chloride may be isolated from the leach for use where highly pure sodium chloride is required.

The Downs cell is operated using conventional means and the sodium that is obtained may be recycled directly for use in the reduction of silicon tetrafluoride.

We claim:

1. A process for the production of silicon, titanium, zirconium or uranium which comprises:
   (a) reacting silicon tetrafluoride, titanium tetrafluoride, zirconium tetrafluoride, uranium tetrafluoride or uranium hexafluoride with elemental sodium to obtain a mixture of silicon titanium, zirconium or uranium and sodium fluoride;
   (b) adding an aqueous solution of an alkaline earth metal chloride;
   (c) allowing the sodium fluoride to react with the alkaline earth metal chloride to form a slurry comprising an insoluble alkaline earth metal fluoride and silicon, titanium, zirconium or uranium in a solution of sodium chloride;
   (d) separating the silicon, titanium, zirconium or uranium from said slurry;
   (e) separating the alkaline earth metal fluoride from said slurry; and
   (f) electrolytically reducing the sodium chloride to obtain pure sodium metal.

2. A process for the production of silicon, titanium, zirconium or uranium as defined in claim 1 wherein the sodium metal from step (f) is recycled to step (a).

3. A process for the production of silicon, titanium, zirconium or uranium as defined in claim 2 wherein the alkaline earth metal chloride is selected from the group consisting of calcium chloride, magnesium chloride and barium chloride.

4. A process for the production of silicon, titanium, zirconium or uranium as defined in claim 3 wherein the alkaline earth metal chloride is calcium chloride.

5. A process for the production of silicon, titanium, zirconium or uranium as defined in claim 4 wherein the pH of calcium chloride solution is adjusted to between 1 and 5 with an acid selected from the group consisting of hydrochloric, hydroiodic, perchloric, nitric and hydrobromic.

6. A process for the production of silicon, titanium, zirconium or uranium as defined in claim 5 wherein the acid is hydrochloric.

7. A process for the production of silicon, titanium, zirconium or uranium as defined in claim 1 wherein prior to the electrolytic reduction of sodium chloride, the water is removed.

8. A process for the production of silicon, titanium, zirconium or uranium as defined in claim 4 wherein the solution of calcium chloride comprises water and from 5% to an amount of calcium chloride that is sufficient to saturate the solution.

9. A process for the production of silicon which comprises:
   (a) reacting silicon tetrafluoride with elemental sodium to produce a mixture of silicon and sodium fluoride;
   (b) adding an aqueous solution of calcium chloride;
   (c) allowing the sodium fluoride to react with the calcium chloride to form a slurry of calcium fluoride and silicon in aqueous sodium chloride;
   (d) separating the silicon from said slurry;
   (e) separating the calcium fluoride from said slurry;
   (f) drying the sodium chloride; and
   (g) electrolytically reducing the sodium chloride to obtain sodium metal.

10. A process for the production of silicon as defined in claim 9 wherein the sodium metal obtained in step (g) is recycled to step (a).

11. A process for the production of silicon as defined in claim 1 which includes the further step of extracting any transition metals from the aqueous sodium chloride prior to carrying out step (f).

* * * * *